May 10, 1932.    J. H. BURNSIDE    1,857,427
SOUND ON FILM REPRODUCING APPARATUS
Filed Oct. 3, 1930    2 Sheets-Sheet 1
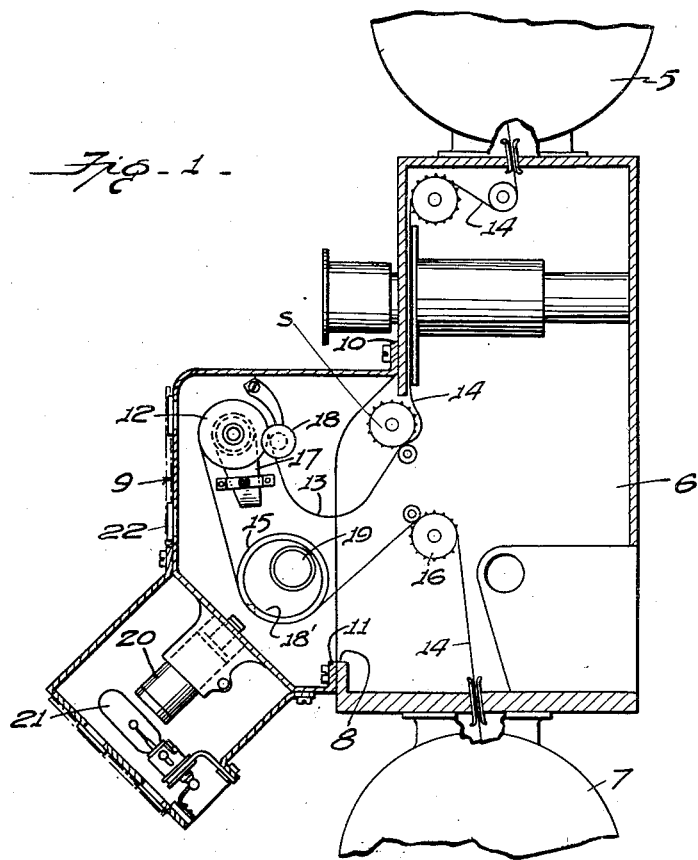
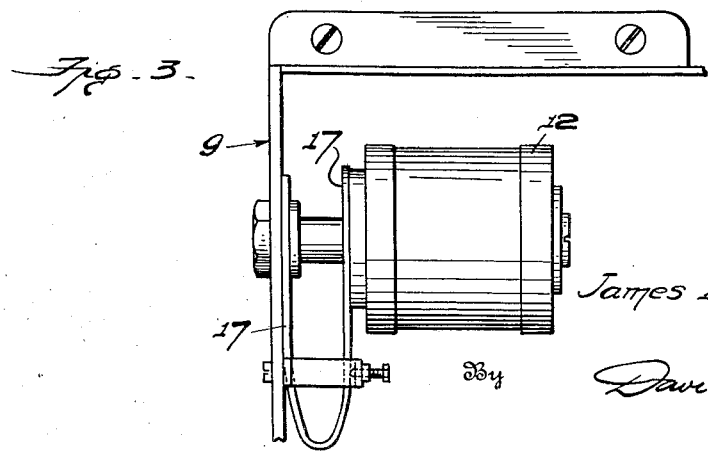
Inventor
James H. Burnside
By David Pelton Moore
Attorney May 10, 1932.   J. H. BURNSIDE   1,857,427
SOUND ON FILM REPRODUCING APPARATUS
Filed Oct. 3, 1930   2 Sheets-Sheet 2
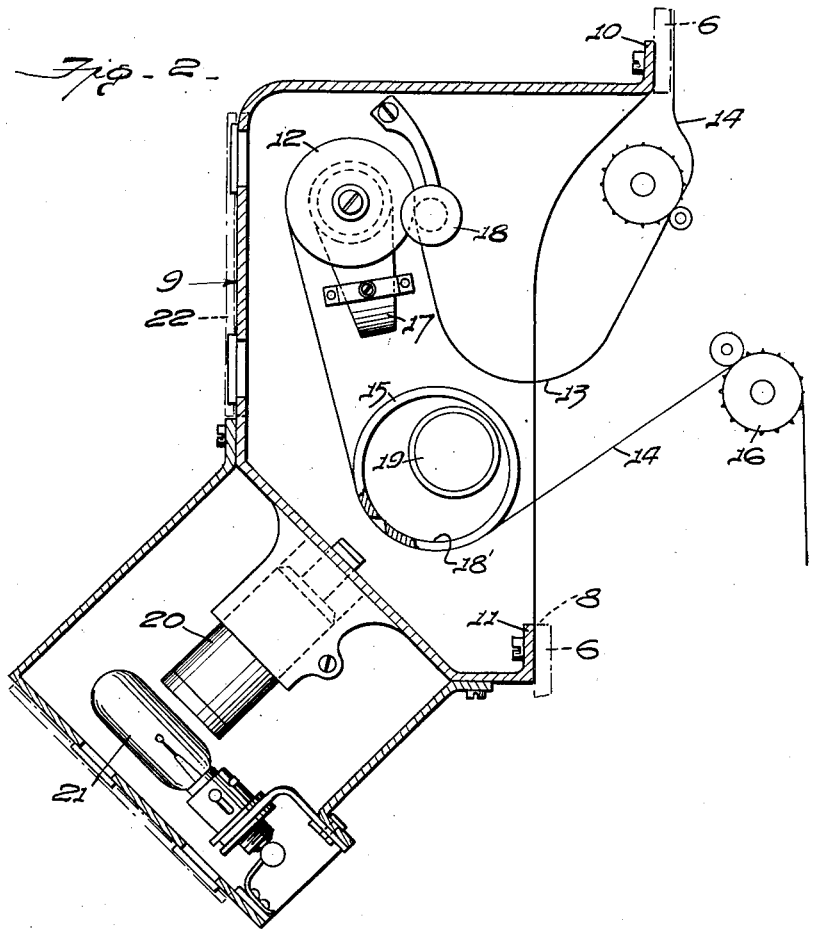
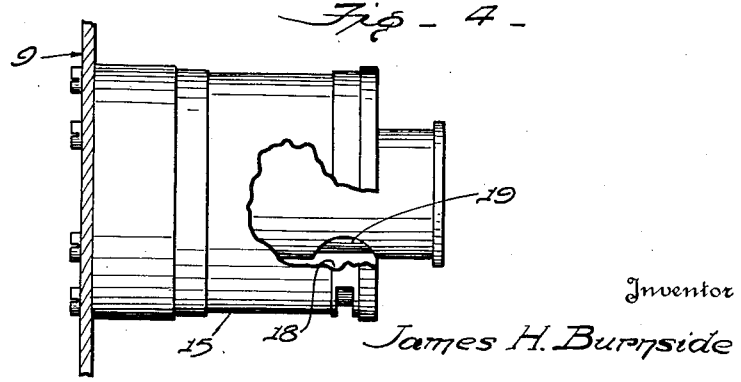
Inventor
James H. Burnside
By David Petty Moore
Attorney Patented May 10, 1932

1,857,427

UNITED STATES PATENT OFFICE

JAMES H. BURNSIDE, OF NEW YORK, N. Y., ASSIGNOR TO GENERAL TALKING PICTURES CORPORATION, OF NEW YORK, N. Y., A CORPORATION OF DELAWARE

SOUND-ON-FILM REPRODUCING APPARATUS

Application filed October 3, 1930. Serial No. 486,232.

The present invention relates to improvements in sound-on-film reproducing apparatus, one object of the invention being the provision of an attachment for the various types of motion picture projecting machines whereby a silent motion picture projector may be readily converted into a sound-on-film projector, and whereby silent films or films used in conjunction with sound disc records may be operated without passing through the present sound-on-film attachment.

Another object of this invention is the provision of a device of this character which is adapted to be attached to the lower rear portion of the motion picture projector so that the film after passing the aperture to form a lower loop at the intermittent sprocket of the motion picture projector is passed through the present sound-on-film attachment and then to the lower constant speed sprocket of the motion picture projector, there being interposed a film guiding member that maintains the loop and insures the smooth taut passage of the film over the slit block.

Still another object of this invention is the provision of a film guiding roller provided with an adjustable braking means whereby the lower loop in the film is maintained so as not to interfere with the intermittent action of the motion picture apparatus and so that the constant speed sprocket of the motion picture projector is utilized to draw the film over the slit block in a steady and even manner thus insuring the best possible reproduction from sound on film.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:—

Figure 1 is a side elevation showing the upper and lower magazine of a well-known type of motion picture projector in which the casing is open to show the proper position of the present sound-on-film attachment.

Figure 2 is an enlarged detailed view of the present sound-on-film attachment.

Figure 3 is a side view of the brake controlled roller of the present attachment.

Figure 4 is a detailed view of the slit block broken away to show the photo-electric cell and cartridge.

Referring to the drawings, the numeral 5 designates the upper film magazine, 6, the intermittent mechanism supporting casing and 7 the lower film magazine all of usual construction in present types of motion picture projectors and particularly that known as the "Simplex". At the rear of the casing 6 is provided an opening 8 which is normally closed by a removable plate (not shown) but which in this instance is closed by the sound-on-film attachment casing 9, the flanges 10 and 11 being bolted or otherwise secured to the casing 6. In this casing 9 is mounted a roller 12 which may be provided with sprocket teeth or may be preferably smooth, it being desirable to provide a means that will insure the lower loop 13 of the film 14 after the film has left the intermittent sprocket S and yet at the same time hold the film taut during its passage over the cylindrical slit block 15 to the lower constant speed sprocket 16 of the motion picture progressing mechanism. In order to offer desired resistance to the action of the film, an adjustable brake device 17 is disposed to cooperate with the roller 12 while also an idler 18 is provided to hold the film in close contact with the roller 12. Thus, it will be seen that when a film provided with a sound track is employed that the same is threaded through, in the usual manner, except that it is passed between the rollers 12 and 18 and over the roller 12 and around the slit block 15 and then over the constant speed sprocket 16 which acts in the usual manner to draw the film through the casing 6 to the lower magazine 7, and as the roller 12 is so proportioned and adjusted as to hold the film taut over the slit block, the intermittent mechanism S is operated in the usual manner with the lower loop 13 in its normal position. While on the other hand, if a silent film or one, with which a disc record is used in conjunction therewith for producing sound pictures, is used, the film is threaded in the usual way and not over the roller 12 and slit block 15.

By providing an attachment of this kind, the same is readily attached to any of the well-known types of motion picture projectors such as the Simplex, Powers, Motiograph and Kalem, etc., without disturbing any of the mechanism or even the removal of the lower magazine, it being only necessary that the aperture of the slit block be in the same relative spaced position to the aperture of the motion picture projector to insure synchronism in the sound reproduction.

The slit block 15 is provided with the cylindrical cavity 18' for the reception of a photoelectric cartridge and cell 19 while an optical system 20 is bodily carried by the casing 9 and in cooperative relation to the detachable exciter lamp 21, a door 22 being provided for the casing 9 so that access may be had thereto as and when necessary.

From the foregoing description taken in connection with the drawings, it is evident that with a sound-on-film attachment constructed according to and embodying the present invention the same is readily attachable to various types of motion picture projectors to convert the silent type to a sound projector and in a very simple manner, and wherein the present new mechanism will maintain the lower loop in the film and at the same time cause the proper delivery of the film over the slit block in a desired continuous motion and through the instrumentality of the lower constant speed sprocket of the motion picture projector, thus insuring a practical device of this character.

What is claimed is:

1. The combination with a motion picture projector having an intermittent film progressing mechanism including an intermittent sprocket and a lower constant speed sprocket, of a unitary sound film attachment including a carrying casing, an adjustable tensioned guiding means including a main roller and smaller roller and over which the film below the lower loop is passed, and a slit block interposed between the latter and the constant speed sprocket whereby the loop is maintained between the guiding means and the intermittent sprocket and the constant speed sprocket draws the film through the attachment.

2. The combination as set forth in claim 1 with an adjustable brake for said main roller for regulating the surface action on the film during the pulling thereof thereover and whereby the lower loop in the film is not interfered with.

3. The combination with a motion picture projector casing having an opening at the lower rear portion thereof and a film progressing mechanism mounted in the casing and including spaced intermittent and constant speed sprockets adjacent to said opening, of a sound-on-film attachment including a casing attached to the projector casing and enclosing said opening thereof, a roller journaled in the latter casing, a tension roller associated therewith and between which the film passes from the intermittent sprocket and by means of which the lower film loop is maintained, and a slit-block having a curved film guiding surface mounted in the latter casing and below the tension roller, whereby the film is drawn there-over by the constant speed sprocket.

4. The combination as claimed in claim 3, in which the attachment casing is divided into two chambers by a lower inclined partition, an optical system mounted in said partition and disposed to project a beam of light upon the slit-block, an excitor lamp mounted in the lower chamber adjacent to the optical system, and a photo-electric cell removably mounted within the slit-block.

In testimony whereof I affix my signature.

JAMES H. BURNSIDE.